UNITED STATES PATENT OFFICE.

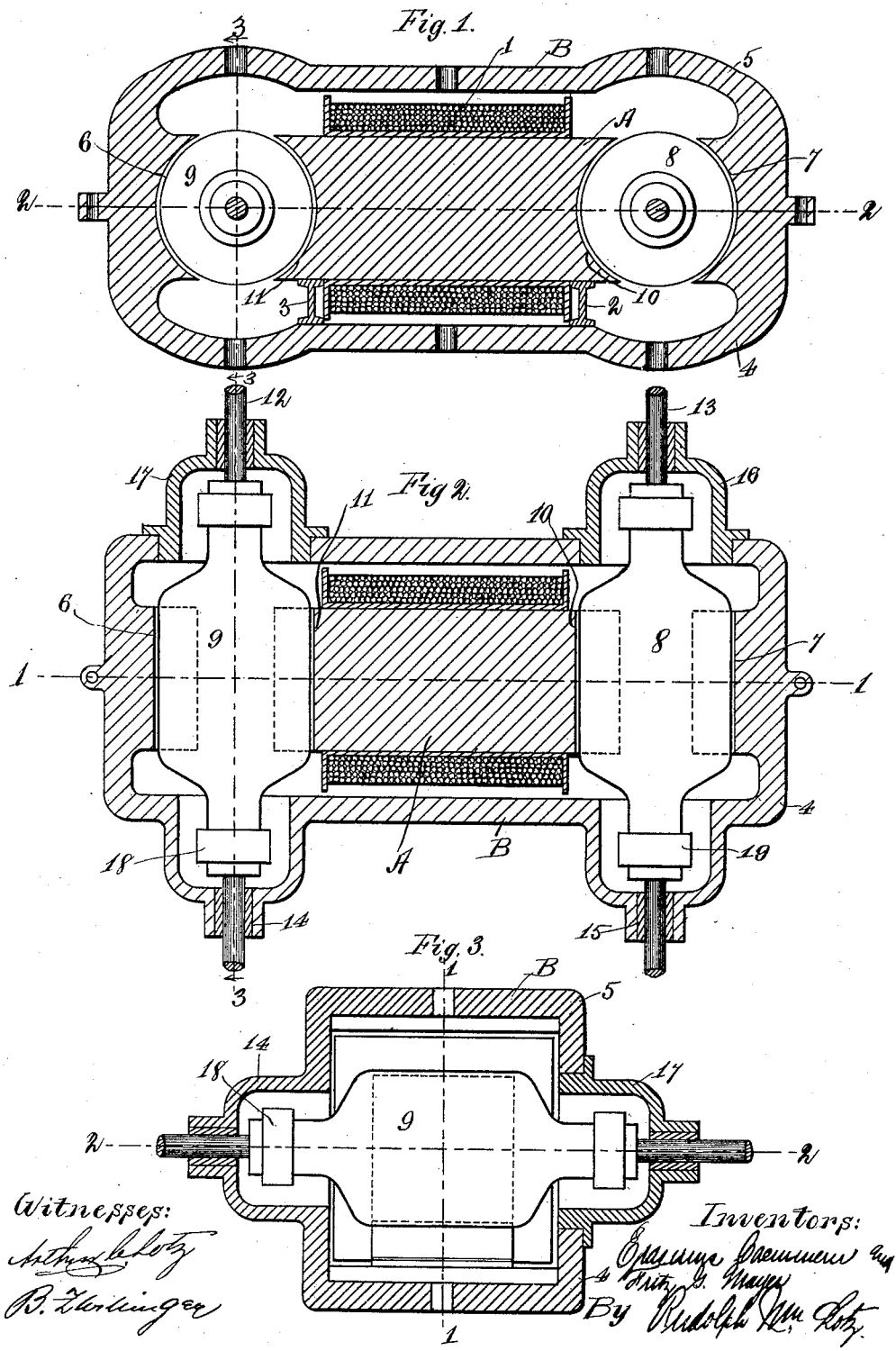

ERASMUS CAEMMERER AND FRITZ G. MAYER, OF CHICAGO, ILLINOIS.

DYNAMO-ELECTRIC MACHINE.

SPECIFICATION forming part of Letters Patent No. 565,530, dated August 11, 1896.

Application filed December 4, 1895. Serial No. 571,076. (No model.)

*To all whom it may concern:*

Be it known that we, ERASMUS CAEMMERER and FRITZ G. MAYER, subjects of the Emperor of Germany, residing at Chicago, in the county of Cook and State of Illinois, have invented certain new and useful Improvements in Dynamo-Electric Machines; and we do hereby declare the following to be a full, clear, and exact description of the invention, such as will enable others skilled in the art to which it appertains to make and use the same.

This invention relates to a novel construction in a dynamo-electric machine, the object being to provide a machine of this character of simple and durable construction and efficient and economical operation; and it consists in the features of construction and combinations of parts hereinafter fully described and specifically claimed.

In the accompanying drawings, illustrating our invention, Figure 1 is a longitudinal section of a machine constructed in accordance with our invention, taken on the lines 1 1 of Figs. 2 and 3. Fig. 2 is a longitudinal section of the same, taken on the lines 2 2 of Figs. 1 and 3. Fig. 3 is a transverse sectional view of same on the lines 3 3 of Figs. 1 and 2.

As it is our intention to use this machine principally as a motor, we will refer to it as such in the following specification.

Referring now to said drawings, A indicates the core of the field-magnet, and B the outer casing, which forms the other member of said field-magnet. The said core A is provided with a magnet-coil 1 and is supported in its place in said casing B by blocks 2 and 3 of a non-magnetic metal. Said casing B consists of two members 4 and 5, which are suitably secured together after said core A has been secured in place in said lower member 4. Said outer casing B is provided on its inner surface at points opposite the ends of said core A with what may be termed "pole-shoes" 6 and 7, between which and the ends of said core the magnetic-fields are formed, in which the armatures 8 and 9 revolve. For purposes of description we will term the ends of said core A "pole-shoes" 1 and 11. Said armatures 8 and 9 are secured upon shafts 12 and 13, which run in bearings 14 and 15 in said casing B on one side, and in bearings in caps 16 and 17, secured to said casing on the opposite side thereof. The said casing B is bulged out on the side on which said bearings 14 and 15 are formed, to admit of placing commutators 18 and 19 between said bearings and said armatures. The said caps 16 and 17 are secured in openings in said casing B opposite said bearings 14 and 15 and are adapted to be removed for purposes of examination or repair without removing the upper member 5 of said casing. For purposes of greater ease in handling, said openings in said casing B are preferably made of sufficient size to admit the passage of the armature therethrough.

We have illustrated our machine as having two commutators for each armature, as it is our intention wherever practicable to employ what we term "double armatures," though ordinary armatures may be employed.

We have also illustrated the core and casing of a rectangular shape, as this will be preferable, to avoid placing rectangular pole-shoes at the ends of said core, which would require additional space.

The illustrations are more diagrammatic in character, as we desire only to illustrate the field-magnets, in the manner of constructing which our invention lies.

By this construction we obtain a dynamo-electric machine of very compact form and of the iron-clad style. By the use of our single core only one magnet-coil is required, which is both economical in construction and saves space. We also obtain two equal magnetic fields, as both lie in the same magnetic circuit.

Supposing, for instance, the pole-shoe 11 of the core to be S and pole-shoe 10 to be N, then the pole-shoe 7 of the casing B would be S, and the pole-shoe 6 would be N, and the magnetic lines of force would pass from S to N through the core, thence through the armature 8 to S of the casing, thence through the casing to N, and thence through the armature 9 to S of the core, thus completing the circuit.

By means of this construction we obtain a far greater number of magnetic circuits than in other dynamo-electric machines of this class, as the shape of the casing B allows of the passage of a greater number of circuits than were heretofore possible. Besides this the casing B performs the double function of field-magnet and a protection to the coils of the core and armatures.

We claim as our invention—

1. In a dynamo-electric machine a field-magnet comprising an outer casing, and a core situated within said casing and supported upon non-magnetic supports, substantially as described.

2. In a dynamo-electric machine, a field-magnet comprising a casing within which the armature revolves, a core situated within said casing and independent thereof, and non-magnetic supports for said core, substantially as described.

3. In a dynamo-electric machine, the combination with a casing of a core supported upon non-magnetic supports therein, said core being independent of said casing, and armatures in said casing, substantially as described.

4. In a dynamo-electric machine, a field-magnet comprising a casing within which the armatures revolve, inwardly-extending pole-shoes in said casing, and an independent core supported upon non-magnetic supports situated within said casing and provided with pole-shoes situated opposite said pole-shoes, on said casing, substantially as described.

In testimony whereof we affix our signatures in presence of two witnesses.

ERASMUS CAEMMERER.
FRITZ G. MAYER.

Witnesses:
RUDOLPH W. LOTZ,
ARTHUR C. LOTZ.